(12) United States Patent
Saet (10) Patent No.: US 10,760,409 B1
(45) Date of Patent: Sep. 1, 2020

(54) FLUID OUTFLOW MEASUREMENT SYSTEM AND METHOD

(71) Applicant: Victor Diocares Saet, Cypress, TX (US)

(72) Inventor: Victor Diocares Saet, Cypress, TX (US)

(*) Notice: Subject to any disclaimer, the term of this patent is extended or adjusted under 35 U.S.C. 154(b) by 168 days.

(21) Appl. No.: 16/189,971

(22) Filed: Nov. 13, 2018

Related U.S. Application Data (60) Provisional application No. 62/585,334, filed on Nov. 13, 2017.

(51) Int. Cl.
| | |
|---|---|
| *E21B 47/10* | (2012.01) |
| *G01F 1/52* | (2006.01) |
| *E21B 47/047* | (2012.01) |

(52) U.S. Cl.
CPC ............ *E21B 47/10* (2013.01); *E21B 47/047* (2020.05); *G01F 1/52* (2013.01)

(58) Field of Classification Search
CPC ........... E21B 47/10; E21B 47/047; G01F 1/52
See application file for complete search history.

(56) References Cited

U.S. PATENT DOCUMENTS

| | | | | |
|---|---|---|---|---|
| 4,754,641 A | * | 7/1988 | Orban .................... | E21B 21/08 73/152.21 |
| 4,887,464 A | * | 12/1989 | Tannenbaum ........ | E21B 49/005 73/152.04 |
| 5,063,776 A | * | 11/1991 | Zanker .................... | E21B 21/08 73/152.21 |

* cited by examiner

*Primary Examiner* — David Z Huang
(74) *Attorney, Agent, or Firm* — Plager Schack LLP; Mark H. Plager; Stephen Hallberg (57) ABSTRACT

A fluid outflow measurement system and a method are disclosed for fluid flow determination that measures and determines fluid flow and retains consistent high-sensitivity and high-accuracy performance throughout the measurement range of zero flow to maximum flow. The fluid outflow measurement system and method adds a fluid height measurement from a sensor mounted on the vertical stack or bell nipple section of a drilling rig. The vertical stack or bell nipple section is a location where a change of flow, manifested by a change in fluid height, is more detectable and makes the overall flow more sensitive throughout zero to maximum flow range, especially at low flows (resulting in better curve shape definitions of flow back signatures) and to subtle flow changes due to micro influxes or losses.

10 Claims, 5 Drawing Sheets

FLUID OUTFLOW MEASUREMENT SYSTEM AND METHOD

CLAIM OF BENEFIT TO PRIOR APPLICATION

This application claims benefit to U.S. Provisional Patent Application 62/585,334, entitled "OUTFLOW MEASUREMENT SYSTEM AND METHOD," filed Nov. 13, 2017. The U.S. Provisional Patent Application 62/585,334 is incorporated herein by reference.

BACKGROUND

Embodiments of the invention described in this specification relate generally to measuring fluid flow rate, and more particularly, to an outflow (or "flow out") measurement system that determines fluid flow by volume and percentage measurements and retains consistent high-sensitivity and high-accuracy performance throughout a measurement range of zero flow to maximum flow utilizing a method for combining fluid level measurement obtained at the outflow vertical section of a drilling rig (i.e., bell nipple or post annular blowout preventer (BOP) area) and flow measurement obtained at the partially-filled pipe section (i.e., return flow line).

Drilling rigs are typically designed with an enclosed or open-channel return flow line. As fluid flows through this return flow line section, it partially fills up the flow channel or pipe, as opposed to filling up the whole pipe like in a full pipe flow regime. Flow indicators or sensors installed on the partially-filled pipe section have poor sensitivity performances especially as flow approaches low levels such as during pumps-off conditions (i.e., when rig pumps are turned off) wherein flow approaches zero flow. Additionally, subtle increases or decreases of flow (e.g., at the onset of a kick or a loss condition) are largely dissipated throughout the length of the return flow line making the subtle change difficult to be detected if only using information from sensors mounted on the return flow line.

Today, existing flow out measurement systems are typically only flow line mounted and in this location, the sensitivity to changes in fluid flow behavior is naturally impaired due to dissipation of subtle changes of flow throughout the return flow line. Minor changes to flow possibly caused by fluid influxes from the formation or fluid losses to the formation, and the back flow (or "flow back") fingerprints created during pumps-off conditions are not sufficiently detectable throughout the return flow line.

Therefore, what is needed is a way to address the unsatisfactory measurement performance of typical existing flow out measurement systems.

BRIEF DESCRIPTION

A novel fluid outflow measurement system that measures and determines fluid flow and retains consistent high-sensitivity and high-accuracy performance throughout a measurement range of zero flow to maximum flow. In some embodiments, the fluid outflow measurement system comprises a flow sensor mounted at the return flow line, a fluid height sensor at one of a vertical stack section and a bell nipple section of the drilling rig, and a flow computer that combines readings from the flow sensor and the fluid height sensor.

In some embodiments, the fluid outflow measurement system comprises a volumetric fluid outflow measurement system that measures and determines volumetric fluid flow and retains consistent high sensitivity and high accuracy performance throughout a volumetric measurement range of zero volumetric flow to maximum volumetric flow.

In some embodiments, the fluid outflow measurement system comprises a percentage fluid outflow measurement system that measures and determines percentage of fluid flow and retains consistent high sensitivity and high accuracy performance throughout a percentage measurement range of zero percent flow to maximum percentage flow.

Some embodiments include a novel fluid outflow measurement method for combining fluid level measurement obtained at a vertical outflow section of a drilling rig and flow measurement obtained at a partially-filled return flow line pipe section of the drilling rig. In some embodiments, the fluid outflow measurement system utilizes the fluid outflow measurement method to measure and determine fluid flow and retain consistent high-sensitivity and high-accuracy performance throughout the measurement range of zero flow to maximum flow. In some embodiments, the flow measurement obtained at the partially-filled pipe section comprises a volumetric flow measurement obtained at the partially-filled pipe section. In some embodiments, the flow measurement obtained at the partially-filled pipe section comprises a percentage flow measurement obtained at the partially-filled pipe section.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a fluid outflow measurement system that measures and determines fluid flow and retains consistent high-sensitivity and high-accuracy performance throughout a measurement range of zero flow to maximum flow and a fluid outflow measurement method for combining fluid level measurement obtained at a vertical outflow section of a drilling rig and flow measurement obtained at a partially-filled return flow line pipe section of the drilling rig. In some embodiments, the fluid outflow measurement system utilizes the fluid outflow measurement method for combining fluid level measurement obtained at a vertical outflow section of a drilling rig and flow measurement obtained at a partially-filled return flow line pipe section of the drilling rig to determine fluid flow and retain consistent high-sensitivity and high-accuracy performance throughout the measurement range of zero flow to maximum flow.

In some embodiments, the outflow vertical stack or a bell nipple section of the drilling rig comprises at least one of a bell nipple and a post annular BOP area. In some embodiments, the partially-filled pipe section comprises a return flow line. The vertical stack or bell nipple section is a location where a change of flow, which is manifested by a change in fluid height, is significantly more detectable and therefore makes the overall flow more sensitive throughout zero to maximum flow range, and especially to low flows (thereby resulting in better curve shape definitions of flow back signatures) and to subtle flow changes due to micro influxes or losses. Ultimately, with this combined measurement approach to create an improved overall flow, fluid circulation anomalies which can quickly turn in a life and property threatening situation can be discovered earlier.

As stated above, drilling rigs are typically designed with an enclosed or open-channel return flow line. As fluid flows through this return flow line section, it partially fills up the flow channel or pipe, as opposed to filling up the whole pipe like in a full pipe flow regime. Flow indicators or sensors installed on the partially-filled pipe section have poor sensitivity performances especially as flow approaches low levels such as during pumps-off conditions (i.e., when rig pumps are turned off) wherein flow approaches zero flow. Additionally, subtle increases or decreases of flow (e.g., at the onset of a kick or loss condition) are largely dissipated throughout the length of the return flow line making the subtle change difficult to be detected if only using information from sensors mounted on the return flow line. Still, the existing conventional flow measurement systems on drilling rigs typically have only one or more sensors mounted at the return flow line. However, the sensitivity to changes in fluid flow behavior is naturally impaired at this location due to dissipation of subtle changes of flow throughout the return flow line. Minor changes to flow possibly caused by fluid influxes from the formation or fluid losses to the formation, and the "back flow fingerprints" created during pumps off conditions are not sufficiently detectable which such sensor arrangement, regardless of sensing technology implemented Embodiments of the fluid outflow measurement system and method described in this specification solve such problems by adding a fluid height measurement sensor mounted on the vertical stack or bell nipple section of the drilling rig, which allows more sensitive detection of flow compared with existing systems because the vertical stack or bell nipple section is a location where a change of flow, which is manifested by a change in fluid height, is significantly more detectable and therefore makes the overall flow more sensitive throughout zero to maximum flow range, especially to low flows (thereby resulting in better curve shape definitions of flow back signatures) and to subtle flow changes due to micro influxes or losses. Combining the reading of a flow sensor, such as a volumetric flow sensor or a percentage flow sensor, mounted on the partially filled flow line section with the reading from a fluid height sensor mounted on the vertical section of the outflow fluid path results in an overall flow sensitivity throughout the operational range that is significantly improved, and ultimately results in the ability for earlier discovery of fluid circulation anomalies (which can quickly turn in a life and property threatening situation).

Embodiments of the fluid outflow measurement system and method described in this specification differ from and improve upon currently existing options. In particular, the combination of a flow sensor (volumetric or percentage flow sensor) at the partially filled flow line and a fluid height sensor at the vertical section before the flow line makes the overall flow information significantly different from and better than the existing systems and techniques. With just a flow line mounted sensor, sensitivity performance at low flows or flows approaching zero flow remains poor. However, with the addition of a fluid level sensor at the vertical section (e.g., bell nipple area), where changes in flow are more sensitively exposed by fluid level changes, the overall flow is greatly improved because the combination of two measurements delivers excellent sensitivity throughout the flow range (i.e., from zero flow to maximum flow).

In some embodiments of the fluid outflow measurement system, the flow at the return flow line is characterized by either the height (or percentage) of the flowing fluid through the downward-sloped pipe or a volumetric flow measurement of the fluid, considering primarily the velocity of the fluid.

Given the natural dissipation effects of flow changes across the length of the flow line, if flow out information is only derived from a sensor mounted on the flow line, the overall flow result will always be an unsatisfactory quantitative representation of actual flow especially on the lower flow levels. However, the fluid outflow measurement system and method of the present disclosure addresses the unsatisfactory measurement performance by adding a fluid height measurement from a sensor mounted on the vertical stack or bell nipple section of the drilling rig. The vertical stack or bell nipple section is a location where a change of flow, which is manifested by a change in fluid height, is significantly more detectable and therefore makes the overall flow more sensitive to low flows (thereby resulting in better curve shape definitions of flow back signatures) and to subtle flow changes due to micro influxes or losses. Ultimately, with this combined measurement approach to create an improved overall fluid, earlier discovery of anomalies in fluid circulation are possible. Such earlier discovery of fluid circulation anomalies make is possible to thwart dangerous situations (potentially threatening life and/or property) that can quickly arise due to such anomalies.

Several more detailed embodiments are described in the sections below. Section I describes a volumetric fluid outflow measurement system and a percentage fluid outflow measurement system. Section II describes a fluid outflow measurement method. Section III describes electronic systems included in some embodiments of the fluid outflow measurement system and which implement the fluid outflow measurement method.

I. Fluid Outflow Measurement System

In some embodiments, the fluid outflow measurement system comprises a flow sensor mounted at the return flow line, a fluid height sensor at one of a vertical stack section and a bell nipple section of the drilling rig, and a flow computer that combines readings from the flow sensor and the fluid height sensor. In some embodiments, the fluid outflow measurement system obtains fluid height readings from the fluid height sensor mounted on either the vertical stack or the bell nipple section of the drilling rig, where changes in flow are significantly more detectable, thereby making detection of overall flow more sensitive throughout zero to maximum flow range, and especially to low flows, resulting in better curve shape definitions of flow back signatures, and to subtle flow changes due to micro influxes or losses.

The fluid outflow measurement system of the present disclosure may be comprised of the following elements. This list of possible constituent elements is intended to be exemplary only and it is not intended that this list be used to limit the fluid outflow measurement system of the present application to just these elements. Persons having ordinary skill in the art relevant to the present disclosure may understand there to be equivalent elements that may be substituted within the present disclosure without changing the essential function or operation of the fluid outflow measurement system.

1. Flow sensor mounted at return flow line (e.g., volumetric flow sensor, percent flow sensor, etc.)
2. Fluid height sensor at bell nipple/vertical stack section
3. Flow computer combining readings from the flow sensor and the fluid height sensor mounted on the vertical section In a typical drilling rig topology, outflow drilling fluid flows upwards from downhole through the blowout preventer (BOP), then through the vertical stack or bell nipple section, and thereafter, overflows into a return flow line. The flow at the return flow line is characterized by both the height of the flowing fluid through the downward-sloped pipe and the velocity of the fluid.

In some embodiments, the fluid outflow measurement system comprises a volumetric fluid outflow measurement system that measures and determines volumetric fluid flow and retains consistent high sensitivity and high accuracy performance throughout a volumetric measurement range of zero volumetric flow to maximum volumetric flow.

Figure 1:
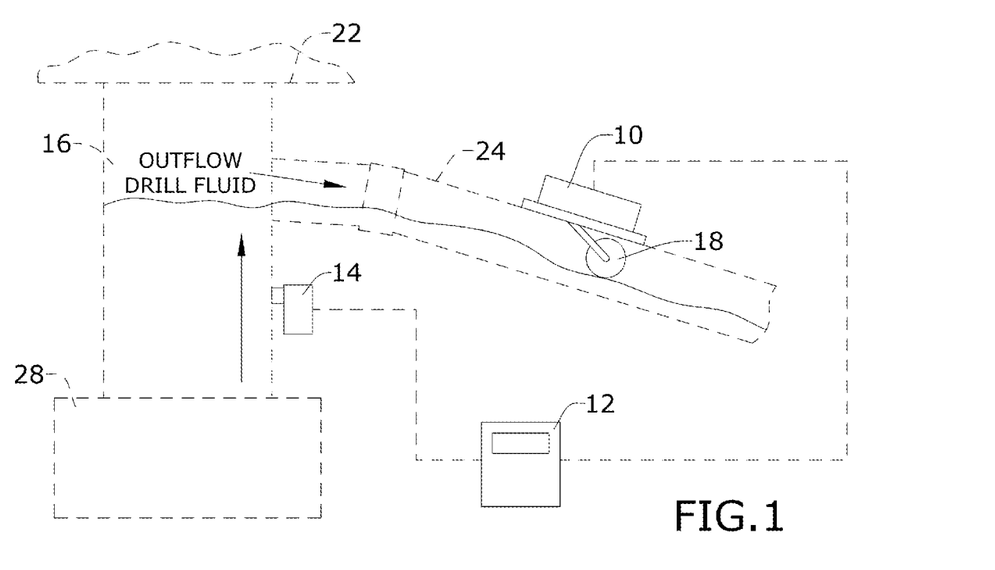
FIG. 1 conceptually illustrates a volumetric fluid outflow measurement system that determines volumetric fluid flow and retains consistent high sensitivity and high accuracy performance throughout a volumetric measurement range of zero volumetric flow to maximum volumetric flow in some embodiments.

By way of example, FIG. 1 conceptually illustrates a volumetric fluid outflow measurement system that determines volumetric fluid flow and retains consistent high sensitivity and high accuracy performance throughout a volumetric measurement range of zero volumetric flow to maximum volumetric flow. As shown in this figure, the volumetric fluid outflow measurement system includes a volumetric flow sensor 10, a flow computer 12, a fluid height sensor 14, a bell nipple/vertical stack 16, and a volumetric flow sensor roller 18, a rig floor 22, a return flow line 24, and a blowout preventer (BOP) 28.

In some embodiments, the volumetric flow sensor 10 quantifies the volumetric flow at the return flow line 24 by way of the volumetric flow sensor roller 18. However, due to its location, the volumetric flow sensor 10 and the volumetric flow sensor roller 18 are expected to deliver unsatisfactory performance for lower flows, such as when there are subtle changes and during pumps-off conditions. In some embodiments, the fluid height sensor 14 mounted on the bell nipple/vertical stack 16 is used to augment and bridge the natural insensitivity of the volumetric sensor 10 mounted on the return flow line 24. Each sensor module on both locations (i.e., the volumetric flow sensor 10 at return flow line 24 and the fluid height sensor 14 mounted on the bell nipple/vertical stack 16) is connected to the special flow computer 12 which includes a software-implementation of the fluid outflow measurement method, thereby allowing the volumetric fluid outflow measurement system to combine the two real-time readings from the volumetric flow sensor 10 (in connection with the volumetric flow sensor roller 18) and the fluid height sensor 14 mounted on the bell nipple/vertical stack 16 to create an overall volumetric flow reading that retains high-sensitivity and high-accuracy data spanning from zero flow to maximum flow.

The volumetric fluid outflow measurement system of the present disclosure generally works by the volumetric flow sensor 10 module allowing for the sensing of volumetric flow at the return flow line 24. The volumetric flow sensor 10 determines volumentric flow by way of the volumetric flow sensor roller 18 based on a volumetric flow measurement of the fluid, which itself is based on a determination of fluid velocity as the volumetric flow sensor roller 18 rolls in connection with fluid flow.

The flow computer 12 provides power to the volumetric flow sensor 10. The volumetric flow sensor 10 provides electrical signals back to the flow computer 12 which relate to the volumetric fluid readings it detects. The electrical signals are converted by the flow computer 12 to digital information. Similarly, the flow computer 12 also provides power to the fluid height sensor 14 mounted on the bell nipple/vertical stack 16. The flow computer 12 reads the fluid height sensor 14 electrical signals and converts the signals to digital information. The method-implementing software running on the flow computer 12 combines the readings from the volumetric flow sensor 10 and the fluid height sensor 14 mounted on the bell nipple/vertical stack 16 and then calculates the overall volumetric flow. This provides accuracy for the overall volumetric flow that exhibits a sensitivity performance far superior to exclusive and independent sensor readings of both the volumetric flow sensor 10 (without the fluid height sensor 14) and, separately, the fluid height sensor 14 mounted on the bell nipple/vertical stack 16 (without the volumetric flow sensor 10) throughout the application range (i.e., zero flow to maximum flow). For its part, the flow computer 12 produces an output data format in real time for third party data display and data storage system. Similarly, the flow computer 12 may include interface components, such as a monitor that allow for visual output of the data.

In some embodiments, the flow computer 12 includes two inputs: the volumetric flow from the volumetric flow sensor 10 at the return flow line 24 and the fluid height sensor 14 mounted on the bell nipple/vertical stack 16. When the overall volumetric flow is beyond a threshold flow level (e.g., a pre-configured threshold flow level), then the overall volumetric flow is taken from the volumetric flow sensor 10 reading. If the overall volumetric flow approaches or goes lower than a low flow threshold flow level, the overall volumetric flow is taken from the calibrated reading of the fluid height sensor 14 mounted on the bell nipple/vertical stack 16, which is continuously fine-tuned using the volumetric flow sensor 10 readings. At any value of volumetric flow, when the fluid height sensor 14 mounted on the bell nipple/vertical stack 16 registers a change of flow, the flow computer 12 determines whether such a change registered by the fluid height sensor 14 mounted on the bell nipple/vertical stack 16 is to a lesser extent also registered by the volumetric flow sensor 10. When the change is registered by both the volumetric flow sensor 10 and the fluid height sensor 14 mounted on the bell nipple/vertical stack 16, then the change of flow is considered a real change in flow.

To make the volumetric fluid outflow measurement system of the present disclosure, one would make or obtain a volumetric flow sensor 10 with volumetric flow sensor roller 18 to mount to the return flow line 24, obtain a fluid height sensor 14 that measures the height of a fluid column (such as the fluid height sensor mounted on the bell nipple/vertical stack 16), and assemble a flow computer 12 which has a specific capability of being able to provide power to and receive sensor signals from the volumetric flow sensor 10 and fluid height sensor 14 in real-time. Having redundant sensors of different measurement technologies could be added to make the fluid outflow measurement system and method work better by being able to average similar readings and to be used for error checking.

The flow computer 12 may include a software implementation of the fluid outflow measurement method to allow for combining of the two real-time information from the volumetric flow sensor 10 and the fluid height sensor 14, and then calculating an overall volumetric flow output reading in real-time. The flow computer 12 would be capable of transmitting out the reading to a third party data destination (e.g., database or display systems). The flow computer 12 can be encapsulated in a flow computer electronic system which also includes interface devices for interacting visually or manually with the flow computer 12 and may include communication devices, such as wireless transceivers (i.e., Bluetooth, WiFi, cellular, etc.). One or more data storage devices may be encapsulated in such a flow computer electronic system, thereby enabling local persistent storage of sensor readings over time. Such locally stored sensor readings and calculations may be synchronized with external targets storage devices in real time or at designated synchronization stages. An example of a flow computer electronic system is described below by reference to FIG. 5.

While the fluid outflow measurement system described above by reference to FIG. 1 focuses on volumetric fluid outflow measurement, other embodiments of the fluid outflow measurement system detect fluid flow in other ways. Specifically, in some embodiments, the fluid outflow measurement system comprises a percentage fluid outflow measurement system that measures and determines percentage of fluid flow and retains consistent high sensitivity and high accuracy performance throughout a percentage measurement range of zero percent flow to maximum percentage flow.

Figure 2:
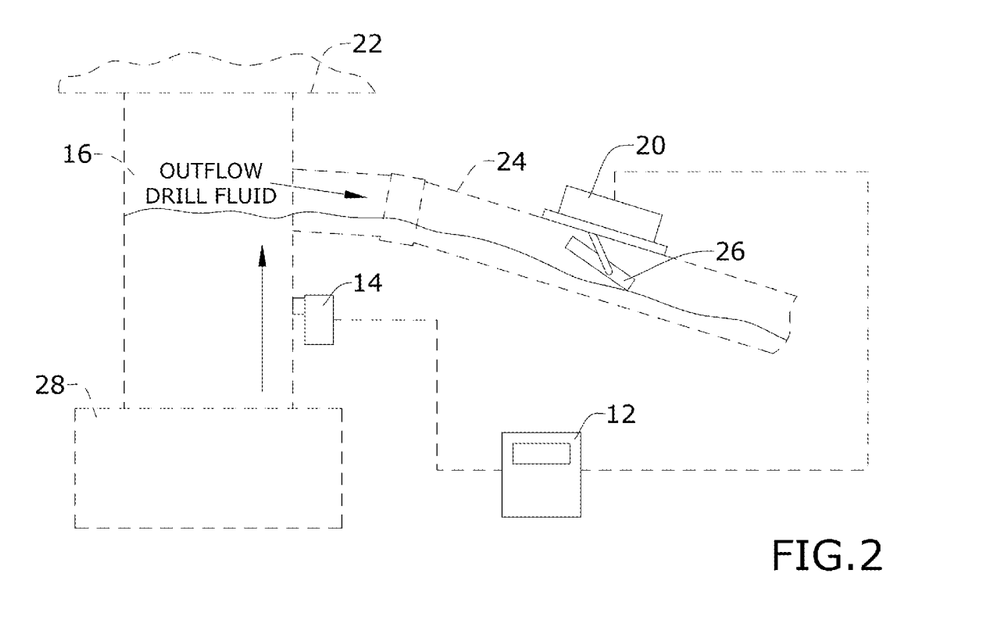
FIG. 2 conceptually illustrates a fluid percentage outflow measurement system that determines percentage of fluid flow and retains consistent high sensitivity and high accuracy performance throughout a percentage measurement range of zero percent flow to maximum percentage flow in some embodiments.

By way of example, FIG. 2 conceptually illustrates a percentage fluid outflow measurement system that determines height percentage of fluid flow and retains consistent high sensitivity and high accuracy performance throughout a height percentage measurement range of zero percent flow to maximum height percentage flow. As shown in this figure, the percentage fluid outflow measurement system includes a percentage flow sensor 20, the flow computer 12, the fluid height sensor 14, the bell nipple/vertical stack 16, a percent flow sensor level 26, the rig floor 22, the return flow line 24, and the blowout preventer (BOP) 28.

The percentage fluid outflow measurement system of the present disclosure generally works in a manner that is similar to the volumetric fluid outflow measurement system, namly, by the percentage flow sensor 20 module (in connection with the percent flow sensor level 26) providing a mechanism to detect or measure the percentage height of the fluid flow at the return flow line 24. The percentage flow sensor 20 determines percentage fluid flow height by way of the percentage flow sensor level 26 based on a percentage height flow measurement of the fluid, which itself is determined by the adjustment of the percentage flow sensor level 26 in connection with fluid flow through the return flow line 24.

The flow computer 12, in turn, takes the corresponding two inputs, namely, the percentage height flow reading from the percentage flow sensor 20 at the return flow line 24 and the fluid height sensor 14 mounted on the bell nipple/vertical stack 16. When the overall percentage flow is beyond a threshold flow level (e.g., a pre-configured threshold flow level), then the overall percentage flow is taken from the percentage flow sensor 20 reading. If the overall percentage flow approaches or goes lower than a low flow threshold level, then the overall percentage flow is taken from the calibrated reading of the fluid height sensor 14 mounted on the bell nipple/vertical stack 16, which is continuously fine-tuned using the percentage flow sensor 20 readings. At any value of percentage flow, when the fluid height sensor 14 mounted on the bell nipple/vertical stack 16 registers a change of flow, the flow computer 12 determines whether such a change registered by the fluid height sensor 14 mounted on the bell nipple/vertical stack 16 is to a lesser extent also registered by the percentage flow sensor 20. When the change is registered by both the percentage flow sensor 20 and the fluid height sensor 14 mounted on the bell nipple/vertical stack 16, then the change of flow is considered a real change in fluid flow.

To make the percentage fluid outflow measurement system of the present disclosure, one would make or obtain a percentage flow sensor 20 with percentage flow sensor level 26 to mount to the return flow line 24, obtain a fluid height sensor 14 that measures the height of a fluid column (such as the fluid height sensor 14 mounted on the bell nipple/vertical stack 16), and assemble the flow computer 12 to be able to provide power to and receive sensor signals from the percentage flow sensor 20 and fluid height sensor 14 in real-time.

While the volumetric and percentage fluid outflow measurement systems described above by reference to FIGS. 1 and 2 demonstrate different, yet similar, ways of determining fluid flow while retaining high sensitivity and high accuracy throughout a range from zero flow to maximum flow, it is noted here that the fluid outflow measurement system may employ other sensors or redundant sensors of different measurement technologies, which when added to the fluid outflow measurement system may provide enhanced or different ways of performing fluid flow determination.

Also, as noted above, the fluid outflow measurement system of some embodiments utilizes the fluid outflow measurement method to measure and determine fluid flow and retain consistent high-sensitivity and high-accuracy performance throughout the measurement range of zero flow to maximum flow. The fluid outflow measurement method is described in the next section.

II. Fluid Outflow Measurement Method

In some embodiments, the fluid outflow measurement method for combining fluid level measurement obtained at an outflow vertical stack or a bell nipple section of a drilling rig and flow measurement obtained at a partially-filled pipe section is utilized by the fluid outflow measurement system. Specifically, when the fluid outflow measurement method is implemented as software and run on the flow computer 12, the flow level measurement obtained at the partially-filled pipe section comprises one of a volumetric flow measurement obtained at the partially-filled pipe section of the drilling rig and a percentage flow measurement obtained at the partially-filled pipe section of the drilling rig.

To use the fluid outflow measurement system of the present disclosure, one perform the fluid outflow measurement method. This generally involves several operations (or steps), including mounting the flow sensor (volumetric or percentage flow sensor) at the flow line, as well as calibrating the flow sensor to display "0.0" flow when there is no flow. Then, in a stepwise fashion, setting up various flow values between zero flow and maximum flow to begin capturing the readings for each step and entering the readings into a calibration table. In some embodiments, the flow sensor (volumetric or percentage flow sensor) may have poor measurement performance (e.g., inconsistent repeatability and poor accuracy performance) for low flows. In any case, next would be to mount the fluid height sensor at the bell nipple or vertical stack section, and then, in a stepwise fashion, set up various flow values from maximum flow and decreasing towards zero flow. As each flow setting is captured by the flow computer, the software combines the readings from the flow sensor and the fluid height sensor and determines a calibration table and/or curve for the overall fluid flow, spanning the entire flow range between zero flow and maximum flow.

Figure 3:
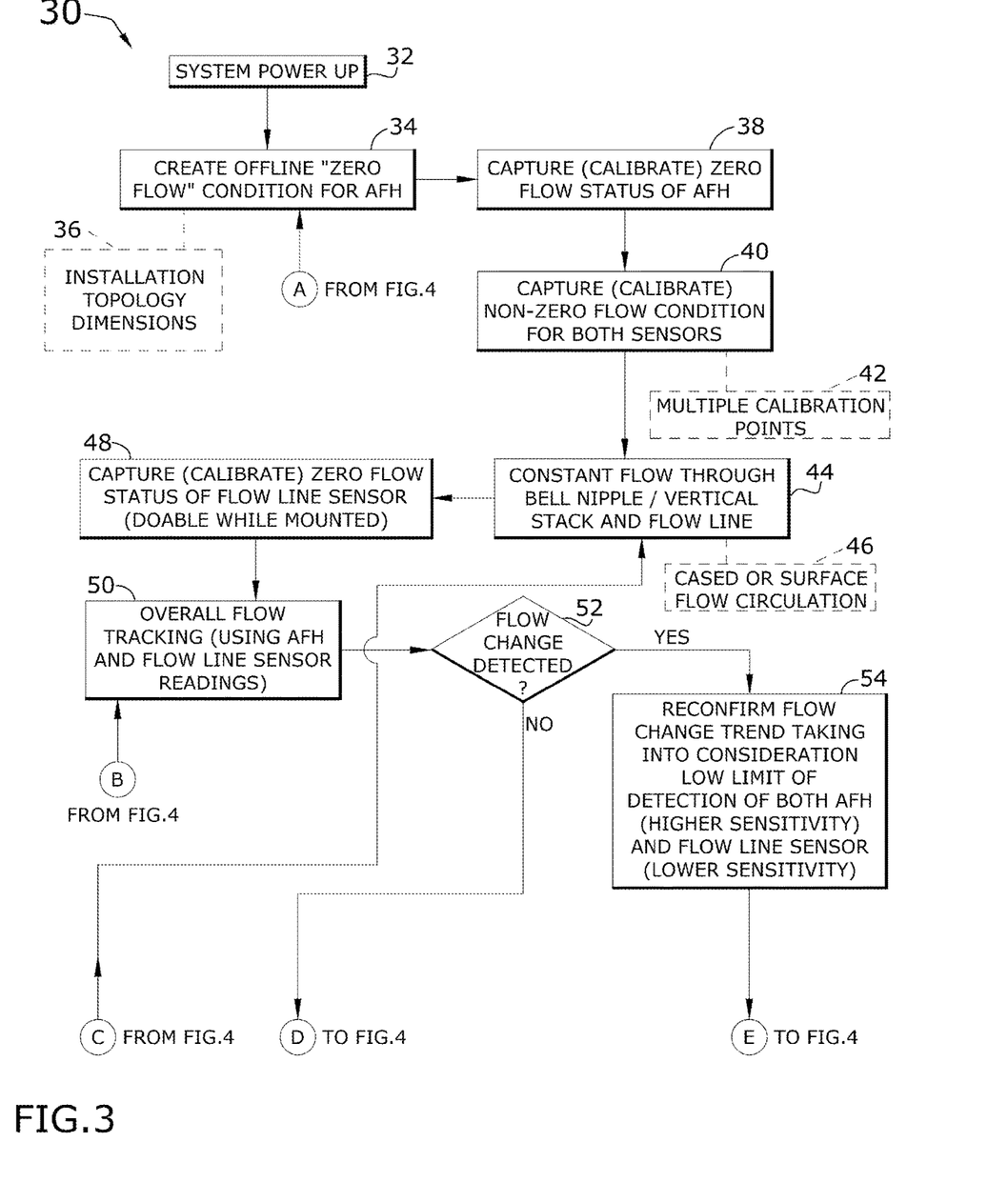
FIG. 3 conceptually illustrates a fluid outflow measurement method for combining fluid level measurement obtained at a vertical outflow section of a drilling rig and flow measurement obtained at a partially-filled return flow line pipe section of the drilling rig in some embodiments.
Figure 4:
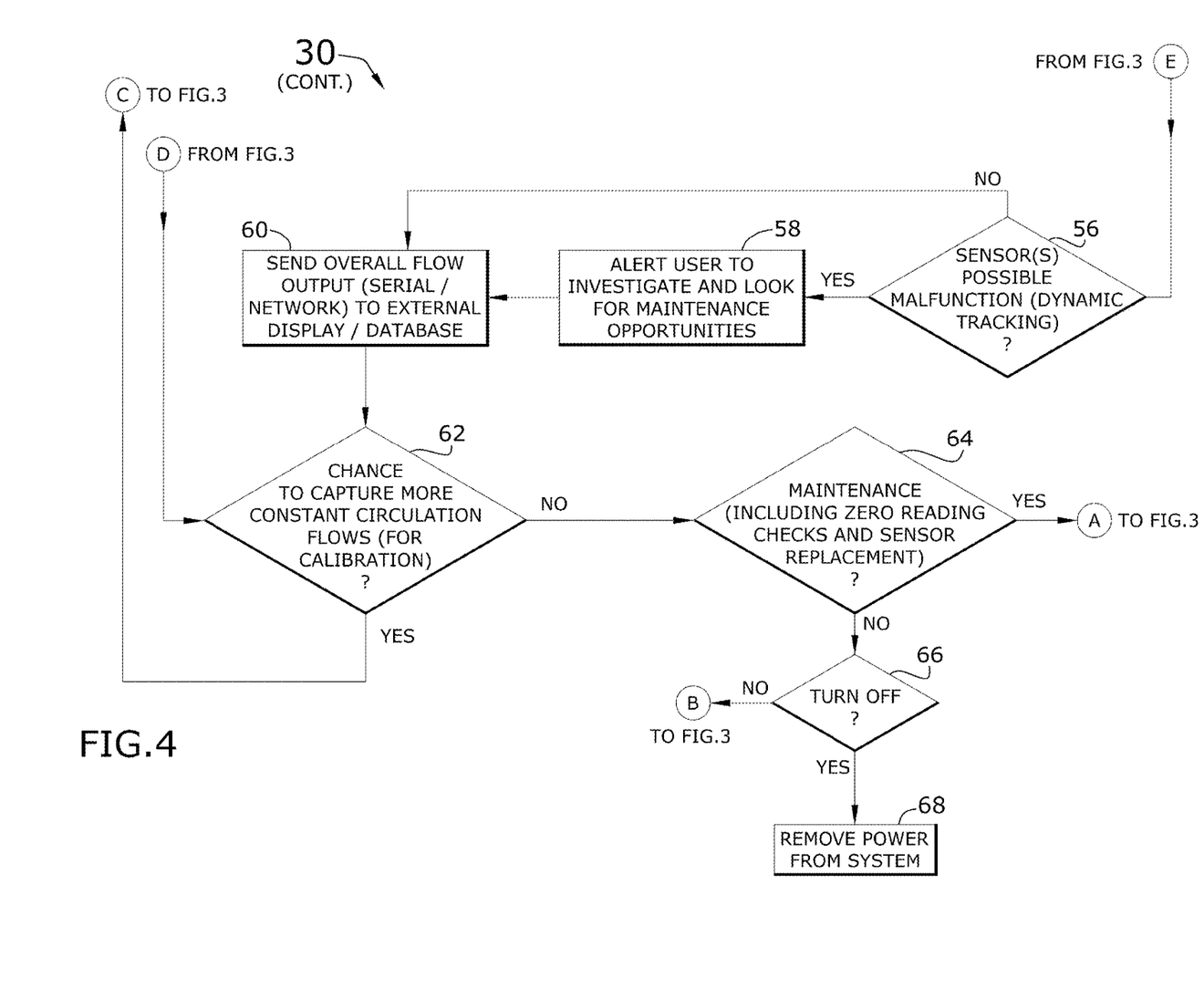
FIG. 4 conceptually illustrates a continuation of the detailed fluid outflow measurement method of FIG. 3.

By way of example, FIGS. 3 and 4 conceptually illustrate a fluid outflow measurement method 30 for combining fluid level measurement obtained at a vertical outflow section of a drilling rig and flow measurement obtained at a partially-filled return flow line pipe section of the drilling rig. The fluid outflow measurement method 30 may be implemented as software and run on the flow computer 12 described above by reference to FIGS. 1 and 2. In this specification, the term "software" is meant to include firmware residing in read-only memory or applications stored in magnetic storage, which can be read into memory for processing by a processor. Thus, the software, when installed to operate on one or more electronic systems (such as the flow computer 12), define one or more specific machine implementations of the fluid outflow measurement method 30 that execute and perform the operations of the software programs as part of the fluid outflow measurement system. Specific details of such electronic systems are described further below by reference to FIGS. 5 and 6.

Referring first to FIG. 3, the fluid outflow measurement method 30 starts with a system power up sequence (at 32). Generally, the power up sequence depends on the flow computer, which provides electric power to the sensors. Further details of the system power distribution are described below by reference to the AFH electronic system in FIG. 5. Next, the fluid outflow measurement method 30 creates (at 34) an offline "zero flow" condition for the AFH electronic system. In some embodiments, the fluid outflow measurement method 30 includes installation (at 36) of topology dimensions for the fluid outflow measurement system.

After the offline "zero flow" condition is created, the fluid outflow measurement method 30 of some embodiments captures and calibrates (at 38) the zero flow status of the AFH electronic system. Next, the fluid outflow measurement method 30 captures and calibrates (at 40) a non-zero flow condition for the fluid height sensor and the flow sensor. In some embodiments, the fluid outflow measurement method 30 includes multiple calibration points (at 42).

In some embodiments, the fluid outflow measurement method 30 continues with constant flow through the bell nipple/vertical stack and flow line (at 44). Furthermore, in some embodiments, the fluid outflow measurement method 30 includes cased or surface flow circulation (at 46). Next, the fluid outflow measurement method 30 captures and calibrates (at 48) the zero flow status of the flow line sensor (which is possible while mounted). The fluid outflow measurement method 30 also performs overall flow tracking (at 50) using AFH and flow line sensor readings. Next, the fluid outflow measurement method 30 determines (at 52) whether a flow change is detected. When a flow change is not detected, the fluid outflow measurement method 30 determines (at 62) whether there is a chance to capture more constant circulation flows for calibration. The determination (at 62) of whether there is a chance to capture more constant circulation flows for calibration is described in greater detail below, by reference to to FIG. 4. On the other hand, when a flow change is affirmatively detected (i.e., above a threshold amount of change), then the fluid outflow measurement method 30 reconfirms (at 54) the flow change trend by taking into consideration a low limit of detection of both the AFH (high sensitivity) and the flow line sensor (lower sensitivity).

Referring now to FIG. 4, after reconfirming (at 54) the flow change trend, the fluid outflow measurement method 30 of some embodiments determines (at 56) whether there is possible malfunction of one or both sensor(s), at least in terms of constant, dynamic tracking. When there is no malfunction, the fluid outflow measurement method 30 sends the overall flow output (at 60) to the external display/monitor and/or to a persistent database. However, when possible malfunction of one or both sensor(s) is determined (at 56), then the fluid outflow measurement method 30 alerts (at 58) a user of the system to investigate and look for maintenance opportunities. The user may be an administrator of the system. Next, the fluid outflow measurement method 30 sends the overall flow output (at 60) to the display/monitor and/or database. In some embodiments, the fluid outflow measurement method 30 sends the overall flow output as a data transmission over a network connection to a serial interface for the display/monitor.

After sending the overall flow output to the display/monitor and/or database, the fluid outflow measurement method 30 of some embodiments then determines (at 62) whether there is a chance to capture more constant circulation flows for calibration. When there is a chance to capture more constant circulation flows for calibration, the fluid outflow measurement method 30 returns to the step for constant flow through the bell nipple/vertical stack and flow line (at 44), which is described above by reference to FIG. 3. In contrast, there when there is no chance capture more constant circulation flows for calibration, the fluid outflow measurement method 30 then determines (at 64) whether to perform maintenance. In some embodiments, maintenance includes zero reading checks and sensor replacement. When maintenance is affirmatively determined to be performed, then the fluid outflow measurement method 30 returns to almost the start to create (at 34) the offline "zero flow" condition for AFH, which is described above by reference to FIG. 3.

On the other hand, when maintenance is not needed, then the fluid outflow measurement method 30 determines (at 66) whether to turn off the AFH electronic system. When AFH electronic system is to be turned off, then the fluid outflow measurement method 30 removes (at 68) power from the system. When power is removed, the entire fluid flow measurement system loses power and shuts down, including the sensors which receive power from the flow computer (AFH electronic system). On the other hand, when the system is not powered down, then the fluid outflow measurement method 30 returns to the step for overall flow tracking (at 50), which is described above by reference to FIG. 3.

III. Electronic Systems

The functions described above can be implemented in digital electronic circuitry, in computer software, firmware or hardware. The techniques can be implemented using one or more computer program products. Programmable processors and computers can be packaged or included in a computer, such as the flow computer described above by reference to FIGS. 1 and 2, but also in other computing device forms, such as micro-computers, mobile computing devices, etc. The processes and logic flows may be performed by one or more programmable processors and by sets of programmable logic circuitry. General and special purpose computing and storage devices can be interconnected through communication networks.

Figure 5:
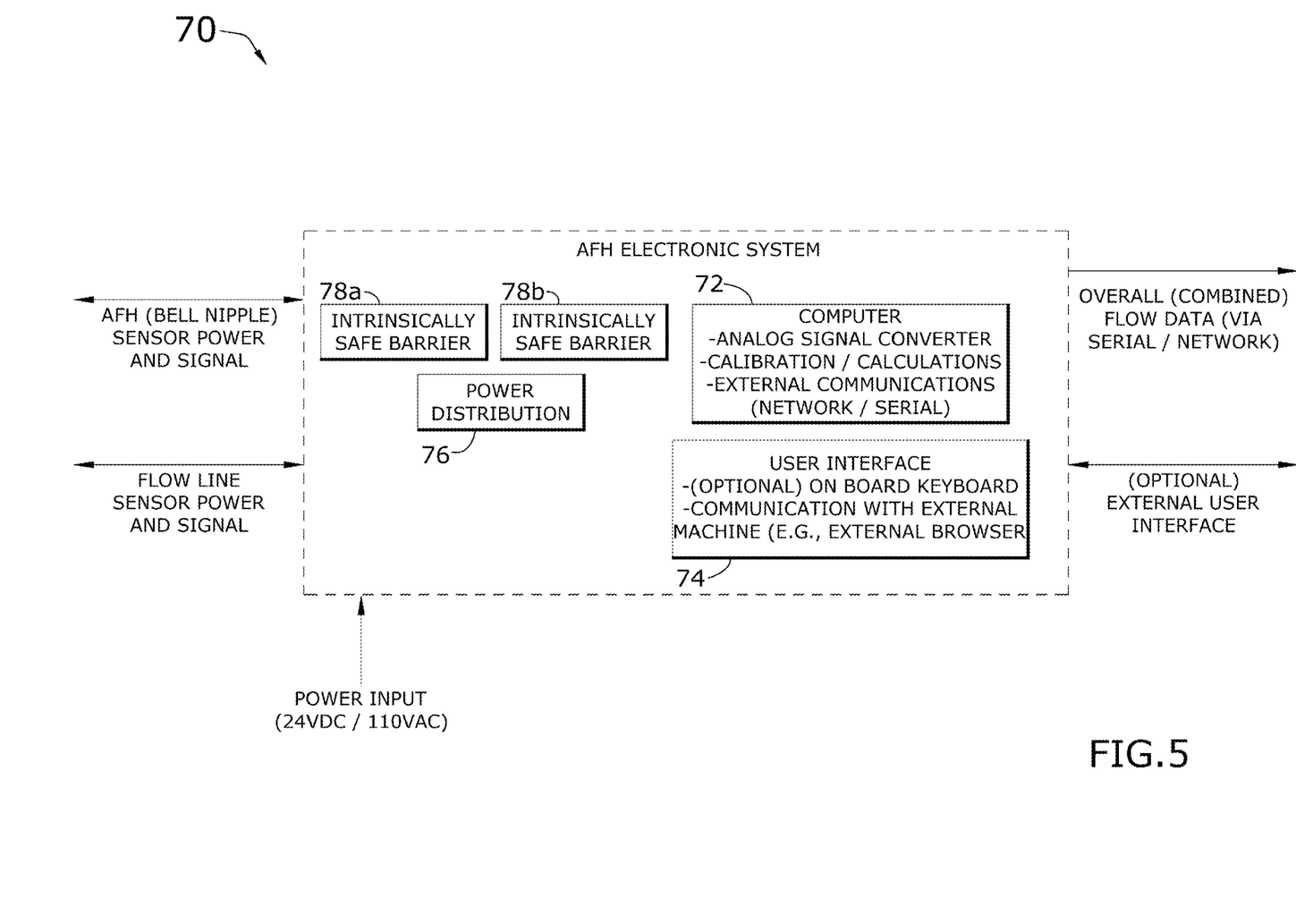
FIG. 5 conceptually illustrates an AFH electronic system that distributes power to the flow sensor and the fluid height sensor and which includes the flow computer to combine readings from the flow sensor and the fluid height sensor.

By way of example, FIG. 5 conceptually illustrates an AFH electronic system 70. As shown in this figure, the AFH electronic system 70 includes a computer 72 (the flow computer 72), a user interface 74, a power distribution module 76, and a pair of intrinsically safe barriers 78a and 78b.

In some embodiments, the flow computer 72 includes an analog signal converter for converting the electronic signals received from the flow sensor along the flow line (return line) and the fluid height sensor mounted to the bell nipple/vertical stack section. The flow computer 72 also includes at least one module or device for calibration, a processor for calculations, a network interface, a serial interface, and external communications devices for network communication at the network interface and/or serial communication at the serial interface. In some embodiments, the flow computer 72 include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations of the fluid outflow measurement system and method.

In some embodiments, the power distribution module 76 provides electric power to the fluid height sensor mounted to the bell nipple/vertical stack section and the flow sensor along the flow line. The power distribution module 76 depends on incoming power input (at 24 volts DC/110 volts AC).

In some embodiments, the AFH electronic system 70 sends overall (combined) flow data out via serial interface connection and/or network interface connection. In some embodiments, the AFH electronic system 70 is connected to external user interface devices and/or modules.

The user interface (UI) 74 includes UI tools for communication with external machines. For example, a browser software application that is able to communicate with an external computing device. The user interface 74 may optionally include peripheral device interfaces, such as an on-board or wired keyboard, pointing device (e.g., computer mouse), etc.

Furthermore, the above-described AFH electronic system 70 and flow computer 72 includes features and applications are implemented as software, which is specified as a set of instructions recorded on the machine readable or computer readable storage medium. When these instructions are executed by one or more processing unit(s) (e.g., one or more processors, cores of processors, or other processing units) of the flow computer 72, they cause the processing unit(s) to perform the actions indicated in the instructions. Examples of computer readable media include, without limitation, flash drives, RAM chips, hard drives, EPROMs, etc. While the flow computer 72 receives electronic signals from the sensors, such electronic signals are converted by the flow computer 72 into digital data. Thus, for purposes of this specification, the computer readable media on which the software resides does not include carrier waves and electronic signals passing wirelessly or over wired connections.

Figure 6:
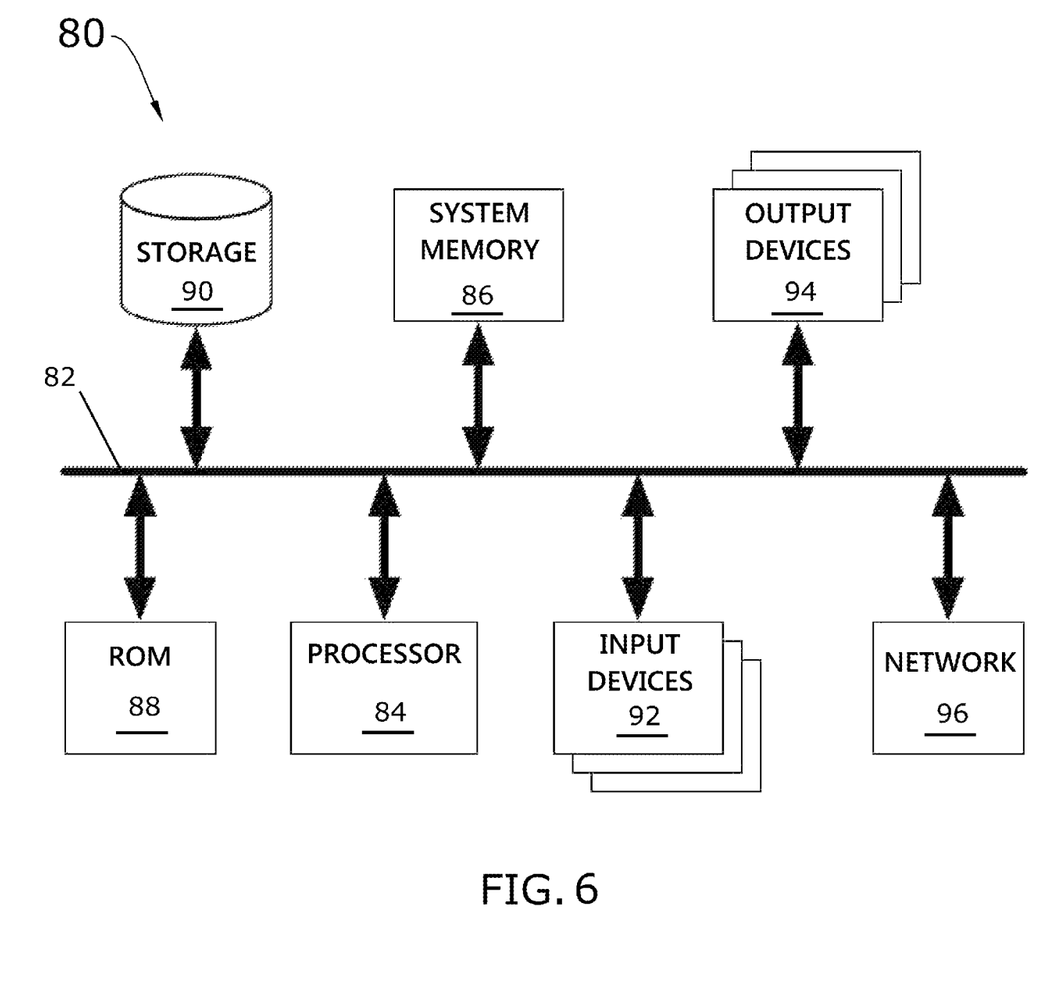
FIG. 6 conceptually illustrates an electronic system with which some embodiments of the invention are implemented.

Now turning to another example of an electronic system. FIG. 6 conceptually illustrates an electronic system 80 with which some embodiments of the invention are implemented, including software implementation of the fluid outflow measurement method for combining fluid level measurement obtained at a vertical outflow section of a drilling rig and flow measurement obtained at a partially-filled return flow line pipe section of the drilling rig. The electronic system 80 may be a computer, a micro-computer, a mobile computing device, or any other sort of electronic device. Such an electronic system includes various types of computer readable media and interfaces for various other types of computer readable media. Electronic system 80 includes a bus 82, processing unit(s) 84, a system memory 86, a read-only memory (ROM) 88, a permanent storage device 90, input devices 92, output devices 94, and a network 96.

The bus 82 collectively represents all system, peripheral, and chipset buses that communicatively connect the numerous internal devices of the electronic system 80. For instance, the bus 82 communicatively connects the processing unit(s) 84 with the read-only memory (ROM) 88, the system memory 86, and the permanent storage device 90.

From these various memory units, the processing unit(s) 84 retrieves instructions to execute and data to process in order to execute the processes of the invention. The processing unit(s) may be a single processor or a multi-core processor in different embodiments.

The read-only memory (ROM) 88 stores static data and instructions that are needed by the processing unit(s) 84 and other modules of the electronic system. The permanent storage device 90, on the other hand, is a read-and-write memory device. This device is a non-volatile memory unit that stores instructions and data even when the electronic system 80 is off. Some embodiments of the invention use a mass-storage device (such as a magnetic or optical disk and its corresponding disk drive) as the permanent storage device 90.

Other embodiments use a removable storage device (such as a floppy disk or a flash drive) as the permanent storage device 90. Like the permanent storage device 90, the system memory 86 is a read-and-write memory device. However, unlike storage device 90, the system memory 86 is a volatile read-and-write memory, such as a random access memory. The system memory 86 stores some of the instructions and data that the processor needs at run time. In some embodiments, the invention's processes are stored in the system memory 86, the permanent storage device 90, and/or the read-only memory (ROM) 88. For example, the various memory units include instructions for processing appearance alterations of displayable characters in accordance with some embodiments. From these various memory units, the processing unit(s) 84 retrieves instructions to execute and data to process in order to execute the processes of some embodiments.

The bus 82 also connects to the input and output devices 92 and 94. The input devices enable the user to communicate information and select commands to the electronic system. The input devices 92 include alphanumeric keyboards and pointing or cursor control devices. The output devices 94 display images generated by the electronic system 80. The output devices 94 include printers and display devices, such as cathode ray tubes (CRT) or liquid crystal displays (LCD). Some embodiments include a touchscreen that functions as both an input and output device.

Finally, as shown in FIG. 6, bus 82 also couples electronic system 80 to a network 96 through a network adapter (not shown). In this manner, the computer can be a part of a network of computers (such as a local area network ("LAN"), a wide area network ("WAN"), or an Intranet), or a network of networks (such as the Internet). Any or all components of electronic system 80 may be used in conjunction with the invention.

While the invention has been described with reference to numerous specific details, one of ordinary skill in the art will recognize that the invention can be embodied in other specific forms without departing from the spirit of the invention. For instance, FIGS. 3 and 4 conceptually illustrate a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A fluid outflow measurement system for fluid flow determination that retains consistent high-sensitivity and high-accuracy performance throughout a measurement range of zero flow to maximum flow, the fluid outflow measurement system comprising:
    a fluid flow sensor that is mounted at a position along a downward-sloped return flow line pipe and quantifies fluid flow at the position along the downward-sloped return flow line pipe;
    a fluid height sensor that is mounted at one of a bell nipple and a vertical stack section of a drilling rig; and
    a flow computing device comprising a processor, a flow software application, and a power distribution module, wherein the flow computing device reads electrical signals received from the fluid flow sensor and the fluid height sensor and converts the electrical signals to digital sensor reading data that is thereafter combined by the flow software application to calculate overall fluid flow.

2. The fluid outflow measurement system of claim 1, wherein the fluid flow sensor comprises a volumetric fluid flow sensor.

3. The fluid outflow measurement system of claim 2, wherein the volumetric fluid flow sensor quantifies volumetric fluid flow.

4. The fluid outflow measurement system of claim 3, wherein the volumetric fluid flow is characterized by velocity of the fluid.

5. The fluid outflow measurement system of claim 1, wherein the fluid flow sensor comprises a percentage fluid flow sensor.

6. The fluid outflow measurement system of claim 5, wherein the percentage fluid flow sensor quantifies percentage fluid flow.

7. The fluid outflow measurement system of claim 6, wherein the percentage fluid flow is characterized by height of the flowing fluid through the downward-sloped return flow line pipe.

8. The fluid outflow measurement system of claim 1, wherein the fluid height sensor is used to augment and bridge natural insensitivity of the fluid flow sensor mounted at the position along the downward-sloped return flow line pipe.

9. The fluid outflow measurement system of claim 1, wherein the power distribution module provides power to the fluid flow sensor and the fluid height sensor.

10. The fluid outflow measurement system of claim 1, wherein the flow computing device repeatedly receives electrical sensor signals and converts the received electrical sensor signals to digital sensor reading data, wherein the flow software application continuously combines the digital sensor reading data to repeatedly recalculate and refine overall fluid flow, wherein when a fluid flow calculation changes more than a threshold amount, the flow software application detects the change in fluid flow.

* * * * *